United States Patent
Chien et al.

(10) Patent No.: US 8,099,542 B2
(45) Date of Patent: Jan. 17, 2012

(54) METHOD FOR RECORDING DATA USING NON-VOLATILE MEMORY

(75) Inventors: Min-Hong Chien, Hsinchu (TW);
Chieh-Chien Huang, Hsinchu (TW);
Yu-Chi Chen, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 893 days.

(21) Appl. No.: 12/043,142

(22) Filed: Mar. 6, 2008

(65) Prior Publication Data

US 2009/0141582 A1 Jun. 4, 2009

(30) Foreign Application Priority Data

Nov. 30, 2007 (TW) ................................. 96145766 A (51) Int. Cl.
*G06F 12/00* (2006.01)
(52) U.S. Cl. .................. 711/103; 711/100; 711/154
(58) Field of Classification Search .................. 711/100, 711/103, 154, 200
See application file for complete search history.

(56) References Cited

U.S. PATENT DOCUMENTS

| | | | | |
|---|---|---|---|---|
| 3,761,901 A | * | 9/1973 | Aneshansley | 365/228 |
| 3,771,148 A | * | 11/1973 | Aneshansley | 365/228 |
| 5,847,991 A | * | 12/1998 | Tong et al. | 365/185.03 |
| 5,896,340 A | * | 4/1999 | Wong et al. | 365/230.03 |
| 7,324,375 B2 | * | 1/2008 | Miwa et al. | 365/185.03 |

FOREIGN PATENT DOCUMENTS

| | | |
|---|---|---|
| CN | 101211626 | 7/2008 |
| TW | 200530814 | 9/2005 |
| TW | I239530 | 9/2005 |

OTHER PUBLICATIONS

"1st Office Action of China Counterpart Application" issued on Nov. 6, 2009, p. 1-p. 3.
"Office Action of Taiwan Counterpart Application", issued on May 27, 2011, p1-p8.

* cited by examiner

*Primary Examiner* — Tuan V. Thai
(74) *Attorney, Agent, or Firm* — Jianq Chyun IP Office (57) ABSTRACT

A method for recording data using a non-volatile memory and an electronic apparatus thereof are provided. In the present method, a set of input data is provided. Then, a data structure of the input data is transformed into a bitmapping data structure. Afterwards, the input data is written sequentially into the non-volatile memory using at least one bit as a basic unit of modification. A total number of bits being modified is then calculated, so as to obtain information needed by the system. Therefore, a minimal memory space is used to record most information, so as to reduce the times for erasing the non-volatile memory and increase the life time of the non-volatile memory.

11 Claims, 5 Drawing Sheets

| 302 | | 304 | | 306 | | 308 | | |
|---|---|---|---|---|---|---|---|---|
| Address | Data | Address | Data | Address | Data | Address | Data | ... |
| 0x20 | 0x17 | 0x32 | 0x20 | 0xFF | 0xFF | 0xFF | 0xFF | |

# METHOD FOR RECORDING DATA USING NON-VOLATILE MEMORY

CROSS-REFERENCE TO RELATED APPLICATION

This application claims the priority benefit of Taiwan application serial no. 96145766, filed on Nov. 30, 2007. The entirety the above-mentioned patent application is hereby incorporated by reference herein and made a part of specification.

BACKGROUND OF THE INVENTION

1. Field of the Invention

The present invention generally relates to a method for recording data using a memory and an apparatus thereof, and in particular, to a method for sequentially recording data using a non-volatile memory and an electronic apparatus thereof.

2. Description of Related Art

Memories can be classified into volatile memories and non-volatile memories according to characteristics thereof. The volatile memories include DRAM and SRAM, which have advantages such as high speed of reading and writing, no need for erasing, and rewritable ability. However, the data stored in the volatile memory is lost easily after the system is powered off (power supply is suspended). On the contrary, the data stored in the non-volatile memory will not be lost after the system is powered off, but it is necessary to erase the old data before writing other new data. There are various non-volatile memories, and the most significant one of which is Flash memory.

Figure 1:
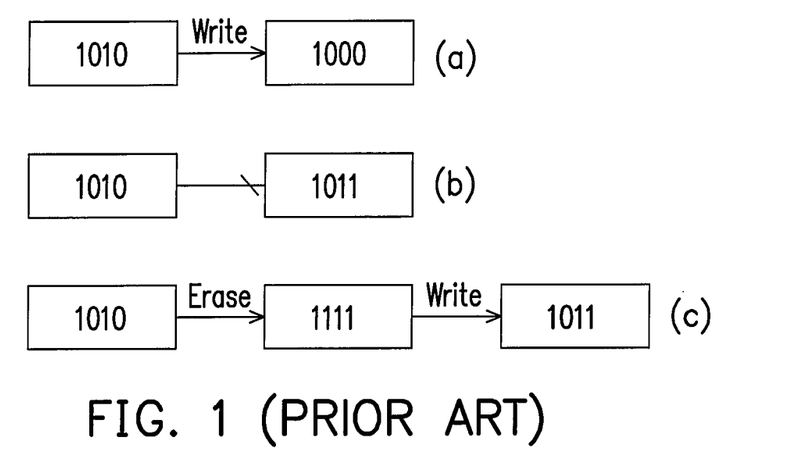
FIG. 1 is a schematic view of characteristics of a conventional non-volatile memory.

The characteristic of the non-volatile memory is that the bit value can only be changed from 1 to 0, and cannot be changed from 0 to 1. When it is required to change 0 to 1, an erasing action is needed. FIG. 1 is a schematic view illustrating the characteristics of the conventional non-volatile memory. Referring to FIG. 1(a), it is assumed that the data originally stored in the non-volatile memory is 1010, when it intends to write data 1000, it is only necessary to change a third bit in the original data 1010 from 1 to 0, without performing the easing. However, as shown in FIG. 1(b), when it intends to write data 1011, the system cannot change 0 to 1, so it is impossible to change a fourth bit of the data 1010 from 0 to 1. At this time, as shown in FIG. 1(c), it is necessary to erase the data 1010 to 1111 first, and then write the data 1011, i.e., change a second bit of the data 1111 from 1 to 0, thereby successfully finishing the action of writing the data.

Figure 2:
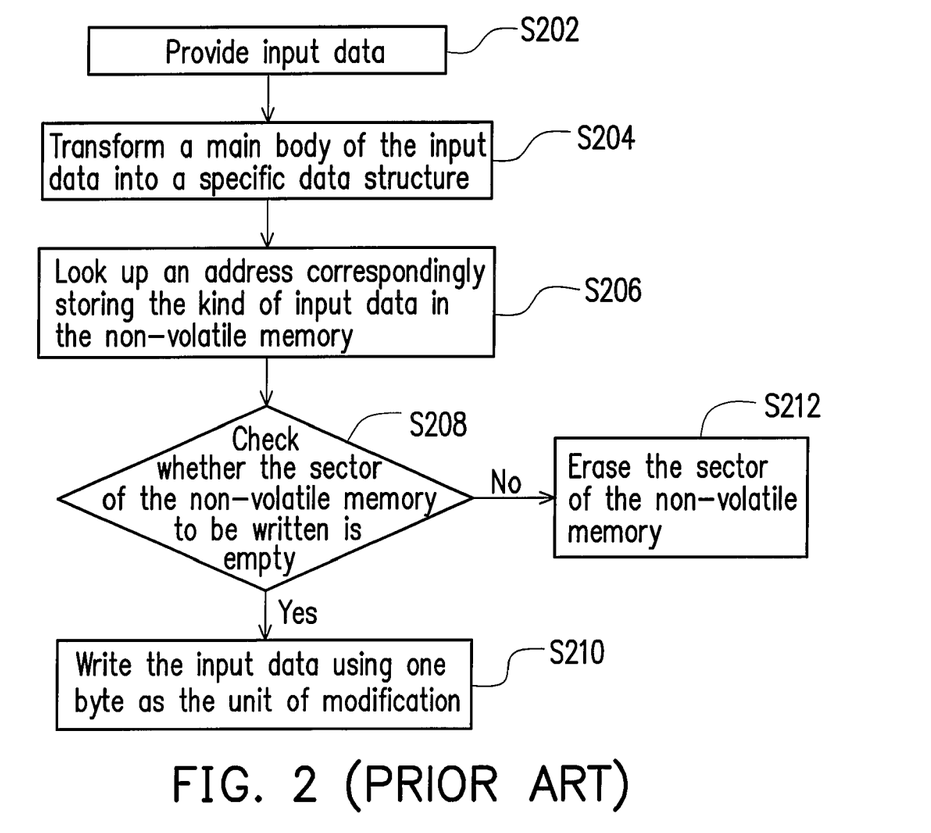
FIG. 2 is a flow chart of a conventional method for recording data using a non-volatile memory.
Figure 3:
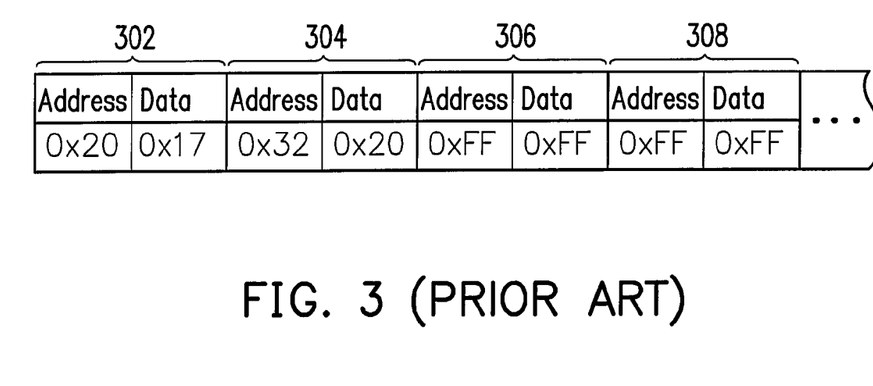
FIG. 3 is a data structure of conventional system parameters.

FIG. 2 is a flow chart of a conventional method for recording data using the non-volatile memory. Referring to FIG. 2, the conventional method for recording data includes preparing input data first (step S202), transforming a main body of the input data into a specific data structure (step S204), and looking up an address correspondingly storing the kind of input data in the non-volatile memory (step S206). Particularly, when performing writing on the non-volatile memory, usually one section is used as a unit, and the sector programs the data structure during storing according to the type of the input data. Therefore, every time when the data is written, it is necessary to transform the data into the data structure corresponding to the sector first and look up the address of the sector, so as to correctly write the input data. For example, FIG. 3 shows the data structure of the conventional system parameters. Referring to FIG. 3, a plurality of sectors storing the parameter data (including sectors 302 to 308) are programmed in the non-volatile memory, and when user needs to write the data into the memory, it is necessary to transform the data into the corresponding data structure before writing the data into the sectors 302 to 308.

After the address storing the input data is decided, it is checked whether the sector of the non-volatile memory in which the data is to be written is empty (step S208). If yes, it represents that all the bit values in the sector are 1, so the erasing step is not required, and the input data can be directly written using a byte as a modifying unit (step S210), that is, when performing the writing action once, the data of at least one byte is updated. On the contrary, if no, it represents that the bit values of some bits in the sector are 0, so the erasing is required (step S212). After erasing, similarly, the input data can be written into the sector of the non-volatile memory using a byte as the modifying unit (step S210).

Figure 4:
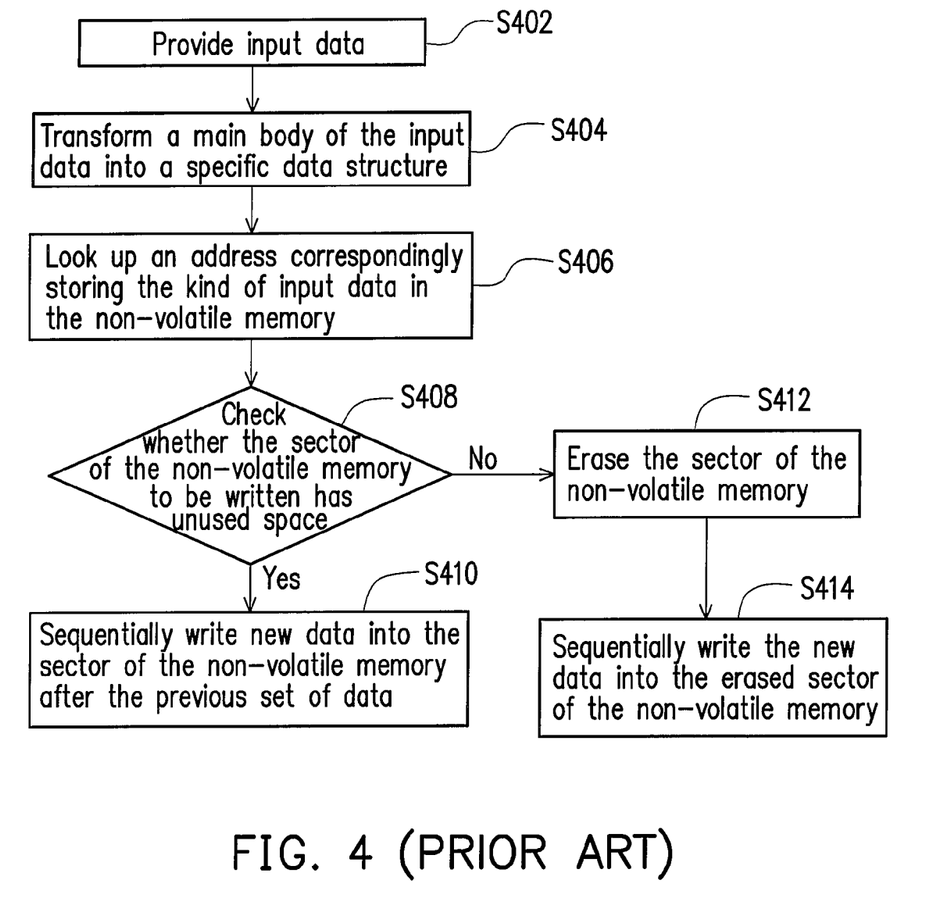
FIG. 4 is a flow chart of the conventional method for recording data using the non-volatile memory.

By the conventional method, it is necessary to erase the non-volatile memory each time when performing writing, which consumes the life of the non-volatile memory. Therefore, in order to reduce the times for erasing the non-volatile memory, a conventional method of successively writing is also provided, that is, when the size of the input data is smaller than a sector, and unused space of the sector is sufficient, new data can be successively written after the previous input data. FIG. 4 is a flow chart of the conventional method for recording data using the non-volatile memory. Referring to FIG. 4, in this method, input data is prepared first (step S402), next a main body of the input data is transformed into a specific data structure (step S404), and an address correspondingly storing the type of input data is looked up in the non-volatile memory (step S406). The above steps are the same as those in the above conventional method for recording data using the non-volatile memory, so the details are not described here.

However, the difference lies in that in step S408, it is checked whether the sector of the non-volatile memory in which the input data has the unused space (step S408). If it is found that the sector of the non-volatile memory has the unused space after checking, the method is changed to directly write the new data after the previous set of data using the byte as the modifying unit (step S410). On the contrary, if the unused space does not exist or the unused space is insufficient, erasing is performed first (step S412), and after erasing, the new data is written into the erased section of the non-volatile memory using the byte as the modifying unit (step S414). It can be understood that although this method can decrease the erasing times, but the minimal unit performing the writing is still one byte, which still results in the waste of space.

To sum up, disadvantages for using the non-volatile memory lie in that erasing times are plenty, and a lot of time is needed by erasing since one sector is used as the unit for each erasing. Generally, sector erase time of a flash is approximately 1 (general count) to 8 (maximal count) seconds, and byte programming time of the flash is approximately 35 (general count) to 300 (maximal count) seconds. In addition, by the above two methods, it is still necessary to frequently perform erasing and rewriting actions. When system configuration or other information is stored in the non-volatile memory, the operation of the system might be unsmooth due to long erasing time. Further, erasing and writing life of a common non-volatile memory is approximately 100,000 times, and frequent erasing and rewriting may shorten the life time and reduce the reliability of the non-volatile memory.

SUMMARY OF THE INVENTION

The present invention is directed to a method for recording data by using a non-volatile memory, capable of transforming input data into data with few bits by bitmapping and sequentially writing the data into the non-volatile memory, so as to reduce erasing counts for the non-volatile memory.

The present invention is directed to an electronic apparatus for recording data by using a non-volatile memory, capable of transforming a data structure of input data by a controller, and sequentially writing the data into the non-volatile memory, so as to reduce memory space required by the recording of the input data.

As embodied and broadly described herein, the present invention provides a method for recording data using a non-volatile memory, which includes providing a set of input data first, transforming a data structure of the input data into a bitmapping data structure, and then sequentially writing the input data into the non-volatile memory using at least one bit as a unit of modification.

In an embodiment of the present invention, the step of transforming the data structure of the input data into the bitmapping data structure includes transforming the input data into data having at least one bit but less than one byte in a bitmapping manner.

In an embodiment of the present invention, the step of sequentially writing the input data into the non-volatile memory includes looking up a writing address correspondingly recording the input data in the non-volatile memory, and sequentially writing the input data to the writing address.

In an embodiment of the present invention, the writing address records a final address of a byte of previous input data. After the step of looking up the writing address, the method further includes determining whether unused space of the byte of the previous input data is sufficient to record the input data, in which if the unused space of the byte is sufficient, the input data is directly written into the byte; if the unused space of the byte is insufficient, a next byte of the non-volatile memory is selected to record the input data when the byte is filled with the input data.

In an embodiment of the present invention, wherein the step of selecting the next byte of the non-volatile memory to record the input data further includes determining whether the unused space of the non-volatile memory is sufficient to record the input data, in which if the unused space of the non-volatile memory is insufficient, the non-volatile memory is erased and the input data is sequentially written; in the other aspect, if the unused space of the non-volatile memory is sufficient, the next byte of the non-volatile memory is directly selected to write the input data.

The present invention provides an electronic apparatus for recording data using a non-volatile memory, which includes a non-volatile memory and a controller. The non-volatile memory is used for storing a plurality of sets of playing information of the electronic apparatus, and the controller is coupled to the non-volatile memory for receiving an input data, transforming a data structure of the input data into a bitmapping data structure, and finally writing the input data into the non-volatile memory using at least one bit as a unit of modification. The controller includes a bitmapping module, suitable for transforming the input data into data having at least one bit but less than one byte in a bitmapping manner.

In an embodiment of the present invention, the controller includes a writing address searching module, suitable for looking up a writing address correspondingly recording the input data in the non-volatile memory, and the controller writes the input data according to the writing address. The writing address is a final address of a byte of previous input data.

In an embodiment of the present invention, the controller further includes a used space determining module, for determining whether the unused space of the byte of the previous input data is sufficient to record the input data, in which if the unused space of the byte is sufficient, the controller directly writes the input data into the byte, and if the unused space of the byte is insufficient, the controller selects a next byte of the non-volatile memory to record the input data when the byte is filled with the input data.

In an embodiment of the present invention, when the used space determining module selects the next byte of the non-volatile memory to record the input data, the used space determining module further determines whether the unused space of the non-volatile memory is sufficient to record the input data, in which if the unused space of the non-volatile memory is insufficient, the non-volatile memory is erased, and the input data is sequentially written.

In an embodiment of the present invention, when the used space determining module determines whether the unused space of the non-volatile memory is sufficient, if the unused space of the non-volatile memory is sufficient, the controller directly selects a next byte of the non-volatile memory to sequentially write the input data.

In an embodiment of the present invention, the non-volatile memory includes a flash memory, and the input data includes playing information of a multimedia player. The playing information includes one of playing time, playing times, and playing channel.

In the present invention, the input data is transformed into data having at least one bit but less than one byte in a bitmapping manner, and when the non-volatile memory is actually written, the input data is successively written after the final address of the byte of the previous input data using at least one bit as the unit for modification. Accordingly, the times for erasing the non-volatile memory can be greatly reduced, so as to prolong life time of the non-volatile memory.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Generally, the playing information of the multimedia player, such as playing time and playing times, must be momentarily updated in playing period of the multimedia. The information is usually recorded in a non-volatile memory built in the multimedia player using a byte as the minimal unit. However, data amount of the playing information is small, and actually it is unnecessary to use a byte to record. If the space occupied by the record can be reduced to a single bit or few bits by transforming the data structure, it is possible to effectively use the non-volatile memory and to reduce the times for erasing the non-volatile memory. The present invention is a method for recording data using a non-volatile memory and an electronic apparatus thereof developed based on the above concept. In order to make the present invention more comprehensible, embodiments are given in the following as examples, according to which the present invention can be surely implemented.

Figure 5:
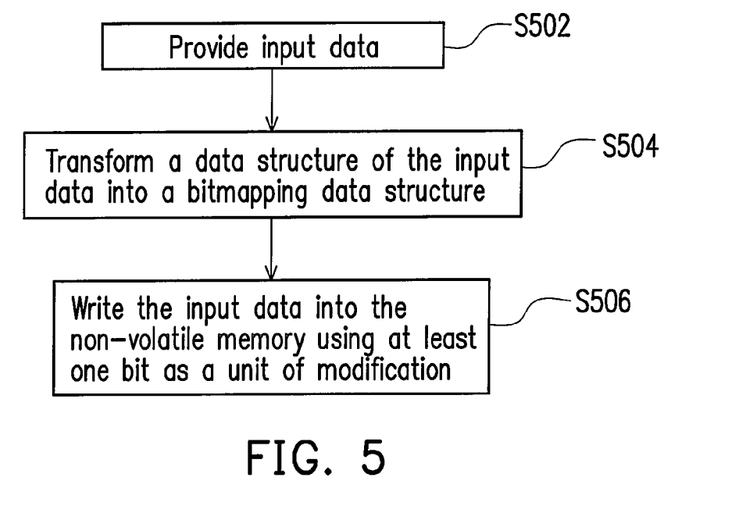
FIG. 5 is a flow chart of a method for recording data using a non-volatile memory according to an embodiment of the present invention.

FIG. 5 is a flow chart of a method for recording data using a non-volatile memory according to an embodiment of the present invention. Referring to FIG. 5, this embodiment is suitable for recording playing information of the multimedia player in the non-volatile memory. The non-volatile memory includes a flash memory, and the playing information includes playing time, playing times, or playing channel etc., and the scope is not limited herein.

Firstly, the multimedia player provides input data (step S502). The input data is, for example, provided by the multimedia player at every specific time interval to sequentially record the playing information such as the playing time and the playing times into the non-volatile memory, for later query.

Next, a data structure of the input data is transformed into a bitmapping data structure (step S504). The bitmapping data structure can be set by users, such that the information originally occupying larger memory space is transformed into data capable of being represented by a single bit or few bits (the minimal unit is one bit) in a bitmapping manner, and is sequentially recorded into the non-volatile memory, so as to reduce the usage of the memory.

Finally, the input data is written into the non-volatile memory using at least one bit as a unit of modification (step S506). Here, the unit of modification for writing the non-volatile memory is determined according to the bitmapping data structure after the transformation of the input data. If the transformed input data is only one bit, the writing unit is one bit, and if the transformed input data is two bits, the writing unit is two bits, and so on and so forth.

It can be known from the present invention, the data originally recorded with a space of one byte or more is transformed to be data recorded by a single bit or few bits, so as to greatly reduce the usage of the memory. In addition, a next set of data is successively recorded after the previous input data, which can also effectively utilize each byte of the non-volatile memory, so as to reduce the times for erasing the data and to increase the life time of the non-volatile memory.

Figure 6:
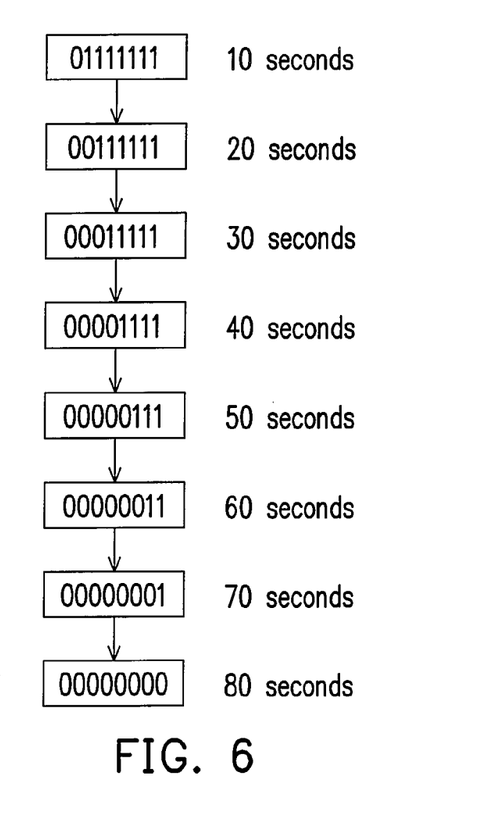
FIG. 6 is an example of using the non-volatile memory to record data according to an embodiment of the present invention.

For example, FIG. 6 is an example of using the non-volatile memory to record the data according to an embodiment of the present invention. Referring to FIG. 6, the playing time of the multimedia player includes the amount of hours, the amount of minutes, and the amount of seconds, and this information originally requires three bytes to record. However, if the method for recording the information is changed to record once at every 10 seconds and record one bit each time in the bitmapping manner, the playing time information up to 80 seconds can be recorded in one byte (8 bits). As shown in FIG. 6, at a first 10 seconds, it is only necessary to modify a first bit of the data 11111111 originally recorded in a byte 600 to 0, at a second 10 seconds, it is only necessary to modify a second bit of the data 01111111 of the byte to 0, and so on and so forth. Accordingly, it is only necessary to modify one bit from 1 to 0 when a set of playing time information is recorded, and one byte can record for eight times. In other words, only one erasing action is required after at least eight sets of playing time information are recorded, and thus the time required to erase the non-volatile memory is effectively decreased. By using the manner of recording the playing time information, the multimedia player can get the playing time only by reading a number of bits with a bit value of 0 in the byte, and continuously play the multimedia data from the playing time.

It should be noted that as compared with the aforesaid step of writing the data, a mechanism for reading the input data is also provided subsequently by the present invention. After the input data is written into the non-volatile memory in step S506, the input data recorded in the non-volatile memory is sequentially read using at least one bit as a reading unit. The reading manner includes, for example, firstly looking up a reading initial address of the corresponding type of input data in the non-volatile memory, and looking up a total number of bits being modified of the corresponding type of data according to the reading initial address, so as to provide information required by the operation of the system. In brief, the "total number of bits being modified" (i.e., number of bits being modified from 1 to 0) is used to obtain the information required by the system.

In the above embodiment, only a single byte is used as an example, but the present invention further includes writing the input data into a plurality of bytes of the non-volatile memory, and the erasing action is performed only when the non-volatile memory is filled with the data. An embodiment is given below for detailed description.

Figure 7:
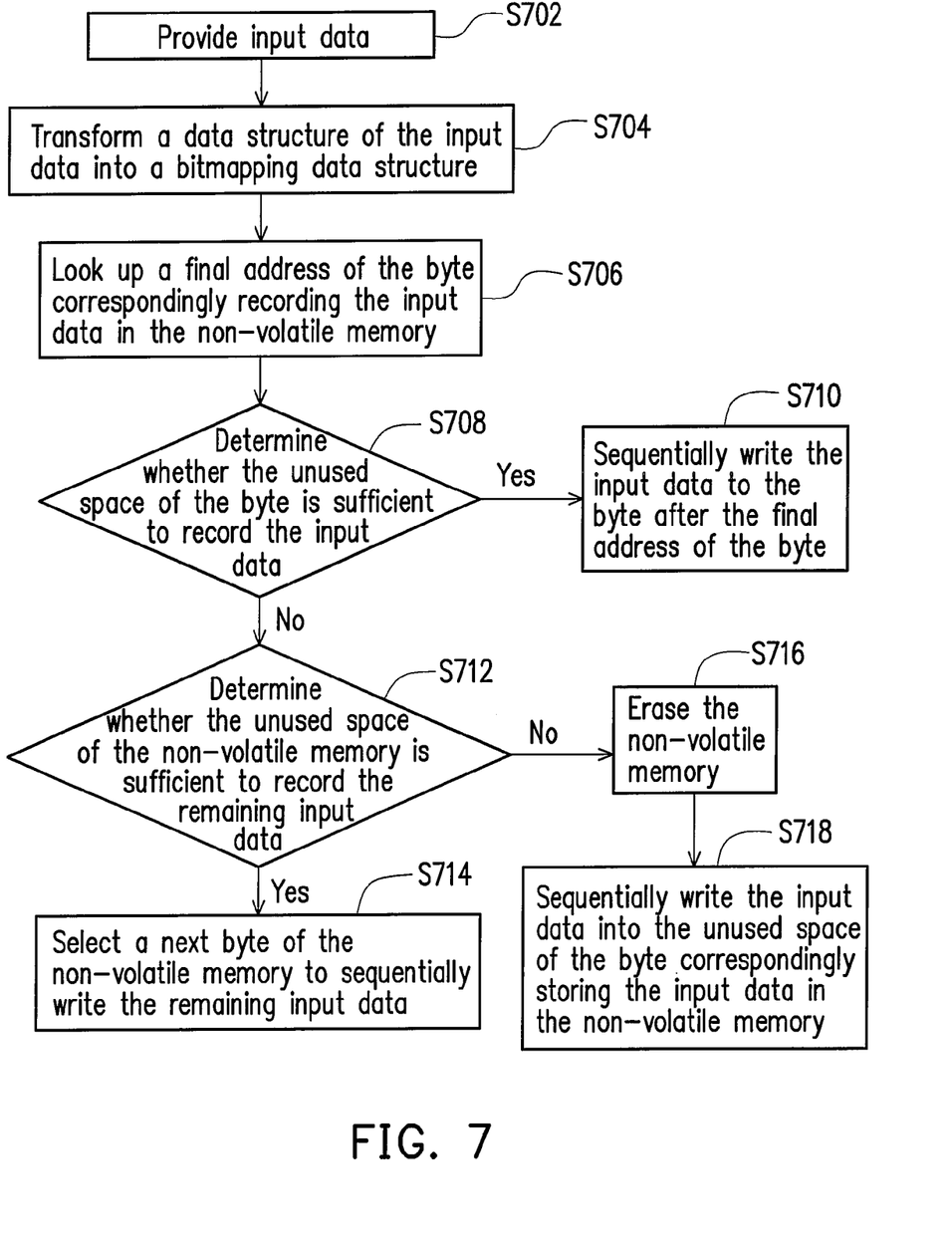
FIG. 7 is a flow chart of the method for recording data using the non-volatile memory according to another embodiment of the present invention.

FIG. 7 is a flow chart of the method for recording data using the non-volatile memory according to another embodiment of the present invention. Referring to FIG. 7, this embodiment is suitable for recording playing information of the multimedia player in the non-volatile memory. A specific sector (including a plurality of bytes) is disposed in the non-volatile memory to store the playing information, and the erasing action is performed only when the specific sector is filled with the playing information. In addition, if it is necessary to store different kinds of system information at the same time, for example, the playing time and the playing times, the specific sector is partitioned into different sub-sectors by adding headers, and the information is correspondingly written into each sub-section by using the above method.

Firstly, input data is provided by the multimedia player (step S702). The input data is, for example, the playing information provided by the multimedia player at every specific time interval, such as the playing time, the playing times, or the playing channel. Next, a data structure of the input data is transformed into a bitmapping data structure (step S704), in which the input data is transformed into data having at least one bit but less than one byte (8 bits) by adopting the bitmapping manner.

Next, the writing address correspondingly recording the input data is looked up from the non-volatile memory (step S706). The writing address is the final address of the byte of previous input data recorded in the non-volatile memory. When the final address is looked up, it is further determined whether the unused space of the byte is sufficient to record the input data (step S708). If the unused space of the byte is sufficient, the input data is directly and successively written after the final address of the byte of the previous input data (step S710). However, if the unused space of the byte is insufficient, a next byte of the non-volatile memory is additionally selected to record the input data when the byte is filled with the input data. At this time, it is further determined whether the unused space of the non-volatile memory is sufficient to record the input data (step S712). If the unused space of the non-volatile memory is sufficient, the next byte of the non-volatile memory is directly selected to write the input data (step S714). However, if the unused space of the non-volatile memory is insufficient, it represents that the next byte for writing the data cannot be found, therefore, it is necessary to erase the non-volatile memory (step S716), and then write the input data (step S718).

It can be known from the above embodiment, a plurality of bytes are disposed in the non-volatile memory to record the playing information, and only a single bit or few bits are used each time the playing information is recorded, so it is possible to use the minimal storage space to record the maximal information. In addition, when the disposed bytes are filled with the playing information (e.g., the bit values in the bytes are all 0), the erasing action of the bytes is performed, so as to reduce the times for erasing the memory.

If the method of the present invention is compared with the two conventional methods, a comparison result can be obtained in Table 1. Referring to Table 1, a way to update data of one 4 KB sector in the non-volatile memory is used as an example. If the conventional method 1 is adopted, the data every time to be written uses one byte as a unit, such that it is necessary to erase once after each set of data is written, in which a ratio of writing and erasing is 1/1. If the conventional method 2 is adopted, the data every time to be written uses one byte as a unit, such that it is necessary to erase once after each 4096 sets of data are written, in which a ratio of writing and erasing is 4096/1. As compared with the method 1, the performance is increased by 4096 times. In addition, if the method 3 of the present invention is adopted, one bit is used as a unit, so it is necessary to erase once after each 32768 sets of data are written, in which a ratio of writing and erasing is 32768/1. As compared with the method 1, the performance is increased by 32768 times, which is quite appreciable.

TABLE 1

|  | Method 1 | Method 2 | Method 3 |
| --- | --- | --- | --- |
| Size of input data | One byte | One byte | One bit |
| Writing times/Erasing times | 1/1 | 4096/1 | 32768/1 |
| Increase of performance | 1 | 4096 | 32768 |

It should be noted that the method for recording data using the non-volatile memory can be realized by electronic apparatus such as the multimedia player. Particularly, besides the playing information of the multimedia player, the information required by the operation of other electronic apparatus can be recorded by using the method of the present invention, so as to reduce the times for erasing the memory. An embodiment is further given below to illustrate the hardware implementation of the present invention.

Figure 8:
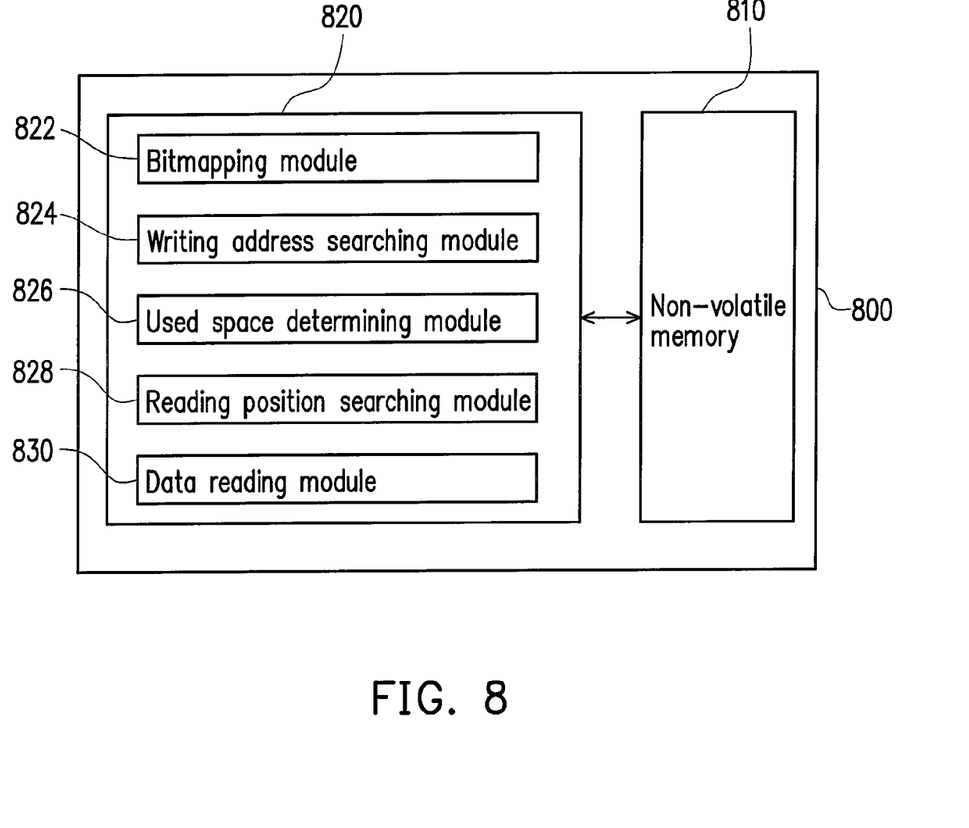
FIG. 8 is a block diagram of the electronic apparatus for recording data using the non-volatile memory according to an embodiment of the present invention.

FIG. 8 is a block diagram of the electronic apparatus for recording data using a non-volatile memory according to an embodiment of the present invention. Referring to FIG. 8, an electronic apparatus 800 of this embodiment includes a non-volatile memory 810 and a controller 820, in which the non-volatile memory 810 is, for example, a flash memory for storing the data written by the controller 820 of the electronic apparatus 800.

The controller 820 is coupled to the non-volatile memory 810 for providing input data, transforming a data structure of the input data into a bitmapping data structure, and writing the input data into the non-volatile memory 810 using at least one bit as a unit of modification.

Particularly, the controller 820 includes a bitmapping module 822, a writing address searching module 824, a used space determining module 826, a reading position searching module 828, and a data reading module 830. The bitmapping module 822 transforms the input data into data having at least one bit but less than one byte in a bitmapping manner. The writing address searching module 824 is used to look up a writing address correspondingly recording the input data in the non-volatile memory 810, and the controller writes the input data into the non-volatile memory 810 accordingly. The writing address is a final address of the byte of previous input data.

In addition, the used space determining module 826 is used to determine whether the unused space of the byte of the previous input data is sufficient to record the recent input data. If the unused space of the byte is sufficient, that is, when the unused bit value is 1, the controller 820 directly writes the input data into the byte sequentially. On the contrary, if the unused space of the byte is insufficient, that is, all the bits in the byte are modified and the bit values thereof are all 0, the controller 820 selects a next byte of the non-volatile memory 810 to record the input data after the byte is filled with the input data.

As compared with the content of the foregoing input data, the present invention also provides a mechanism for reading the input data. The reading position searching module 828 is used to look up a reading initial address of the corresponding type of input data in the non-volatile memory 810, and the data reading module 830 is used to look up a total number of bits being modified of the corresponding type of data according to the reading initial address, so as to provide the information required by the operation of the system.

It should be noted that when the used space determining module 826 selects the next byte of the non-volatile memory to record the input data, the used space determining module 826 further determines whether the unused space of the non-volatile memory 810 is sufficient to record the input data. If the unused space of the non-volatile memory 810 is sufficient, the controller 820 directly selects the next byte of the non-volatile memory 810 to write the input data. On the contrary, if the unused space of the non-volatile memory 810 is insufficient, it is necessary to erase the non-volatile memory 810, and then write the input data.

To sum up, in the method of the present invention for recording data using the non-volatile memory and the electronic apparatus thereof, according to the electrical characteristics of the non-volatile memory, the minimal unit to write the data is changed to a single bit by using the bitmapping data structure, so as to reduce the amount of the data each time written into the non-volatile memory. Therefore, it is not necessary to erase the non-volatile memory frequently, so as to prolong the life time of the non-volatile memory.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for recording data using a non-volatile memory, comprising:

providing input data, wherein the input data is a playing information;

transforming a data structure of the input data into a bitmapping data structure represented by a single bit, including transforming the input data into a data structure having at least one bit but less than one byte by bitmapping; and sequentially writing the input data into the non-volatile memory using one bit as a unit.

2. The method according to claim 1, wherein the step of writing the input data into the non-volatile memory comprises:

looking up a writing address correspondingly recording the input data in the non-volatile memory; and writing the input data to the writing address.

3. The method according to claim 2, wherein the writing address records a final address of a byte of a previous input data.

4. The method according to claim 3, wherein after the step of looking up the writing address comprises:

determining whether unused space of the byte of the previous input data is sufficient to record the input data;

if the unused space of the byte is sufficient, directly writing the input data into the byte; and if the unused space of the byte is insufficient, selecting a next byte of the non-volatile memory to record the input data when the byte is filled with the input data.

5. The method according to claim 4, wherein the step of selecting the next byte of the non-volatile memory to record the input data comprises:

determining whether the unused space of the non-volatile memory is sufficient to record the input data;

if the unused space of the non-volatile memory is insufficient, erasing the non-volatile memory and writing the input data; and if the unused space of the non-volatile memory is sufficient, directly selecting the next byte of the non-volatile memory to write the input data.

6. The method according to claim 1, further comprising:

sequentially reading the input data recorded in the non-volatile memory by using at least one bit as a reading unit.

7. The method according to claim 6, wherein the step of sequentially reading the input data recorded in the non-volatile memory comprises:

looking up a reading initial address of a corresponding type of input data in the non-volatile memory; and looking up a total number of the bits being modified of the corresponding type of data according to the reading initial address, so as to provide information required by the operation of the system.

8. The method according to claim 1, wherein the non-volatile memory comprises a flash memory.

9. The method according to claim 1, wherein the playing information is used in a multimedia player.

10. The method according to claim 9, further comprising partitioning the non-volatile memory into a plurality of sub sectors by adding headers, so as to record different types of the playing information.

11. The method according to claim 9, wherein the playing information comprises one of playing time, playing times, and playing channel.

* * * * *